G. A. BOYDEN.
COMBINED AUTOMATIC AND STRAIGHT AIR BRAKE.
APPLICATION FILED DEC. 23, 1908.
1,075,811.
Patented Oct. 14, 1913.
2 SHEETS—SHEET 2.
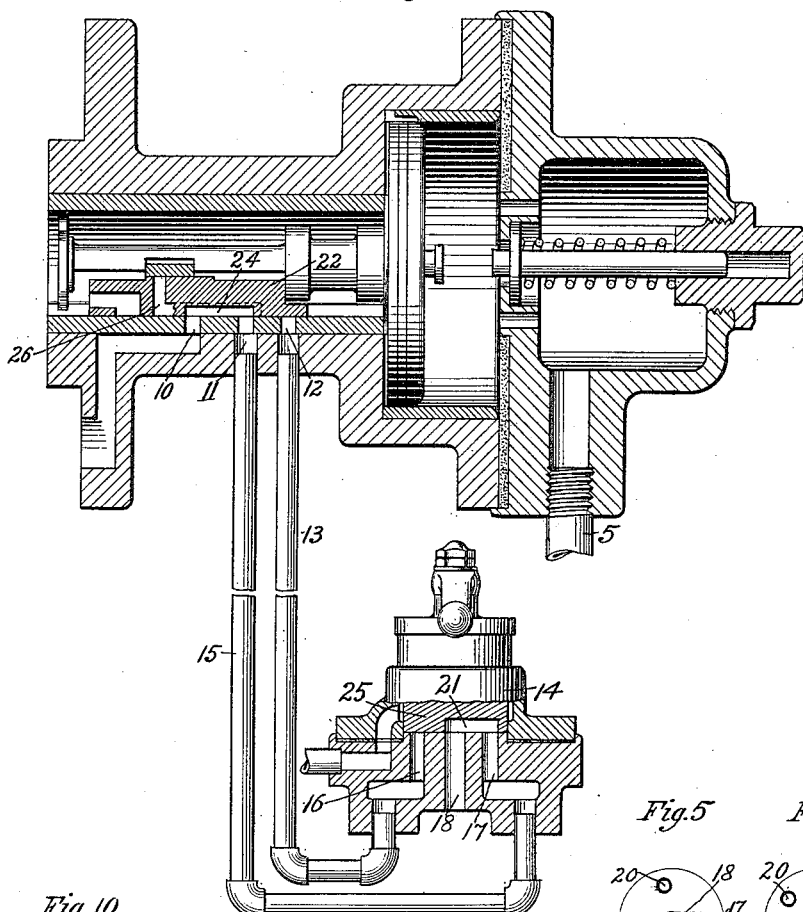
INVENTOR
George A. Boyden
WITNESSES
Att'y.

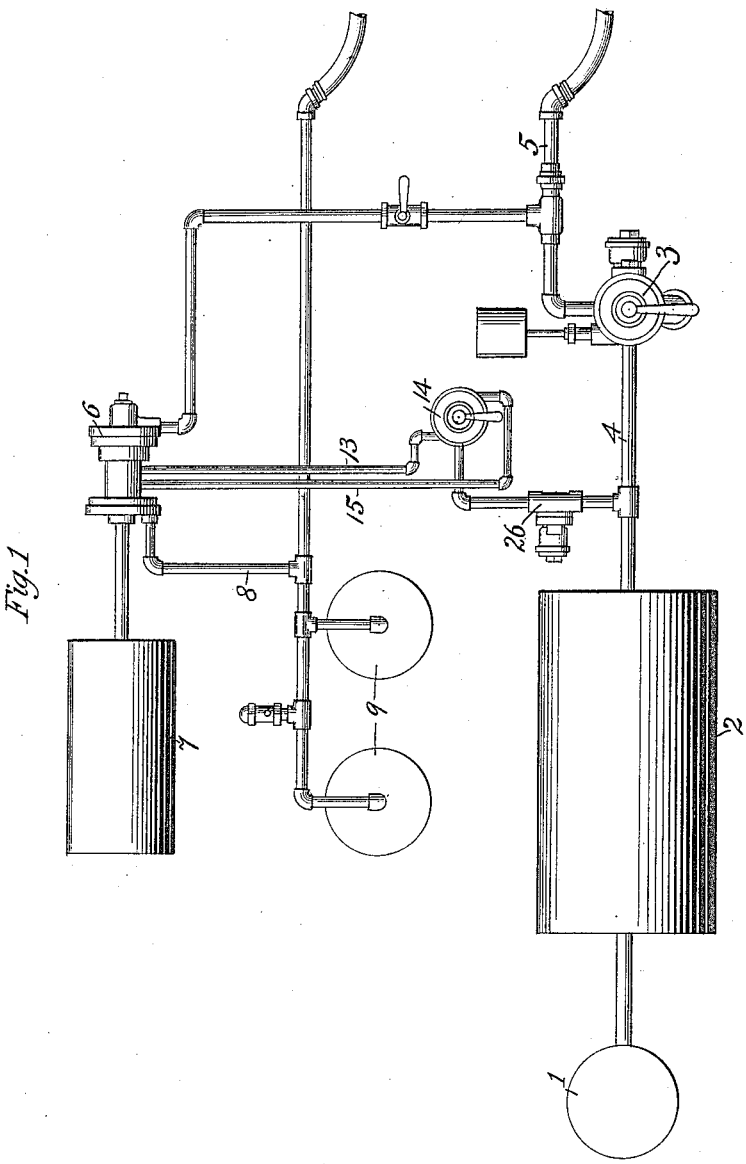

UNITED STATES PATENT OFFICE.

GEORGE ALBERT BOYDEN, OF MOUNT WASHINGTON, MARYLAND, ASSIGNOR TO THE WESTINGHOUSE AIR BRAKE COMPANY, OF PITTSBURGH, PENNSYLVANIA, A CORPORATION OF PENNSYLVANIA.

COMBINED AUTOMATIC AND STRAIGHT-AIR BRAKE.

1,075,811.

Specification of Letters Patent.

Patented Oct. 14, 1913.

Application filed December 23, 1908. Serial No. 468,946.

*To all whom it may concern:*

Be it known that I, GEORGE A. BOYDEN, a citizen of the United States, residing at Mount Washington, in the county of Baltimore and State of Maryland, have invented new and useful Improvements in Combined Automatic and Straight-Air Brakes, of which the following is a specification.

This invention relates in general to fluid pressure brakes, such as are usually operated by compressed air, and more especially to a combined automatic and straight air brake apparatus particularly designed for use upon an engine or locomotive, and adapted to be operated either automatically by reduction in the train brake pipe pressure in the usual way, or by the use of straight air from the main reservoir to the engine brake cylinder.

One of the objects of my present invention is to provide an improved combined apparatus of this character in which the engine brakes may be promptly released by means of the straight air brake valve.

Another object is to provide improved means whereby the engine brakes may be applied and released or controlled at will by means of the straight air brake valve when the triple valve of the automatic system is in service application or lap position, and without moving the triple valve to release position.

Another object is to provide an improved combined apparatus of this character in which the automatic emergency application of brakes may be secured at all times regardless of the position of the straight air brake valve.

In the accompanying drawings; Figure 1 is a diagrammatic view showing a combined automatic and straight air brake equipment embodying my improvements; Fig. 2 a sectional view of the triple valve and straight air brake valve, illustrating a preferred construction of these devices, and the manner of connecting the same; Fig. 3 a plan of the straight air brake valve seat; Fig. 4 a face view of the rotary valve of the straight air brake valve; Figs. 5, 6, 7, and 8 diagrams illustrating the position of the ports of the straight air brake valve in running, lap, application, and release positions respectively, and Figs. 9 and 10 a plan of slide valve seat and face view of slide valve respectively of the triple valve device.

According to the construction as shown, the equipment comprises an air pump 1, a main reservoir 2, automatic engineer's brake valve 3, main reservoir pipe 4, automatic train brake pipe 5, triple valve 6, auxiliary reservoir 7, brake cylinder pipe 8, and engine brake cylinders 9, all of which, with the exception of an additional port and cavity in the triple valve presently to be explained, may be of the well known standard construction.

According to my improvement the triple valve device, in addition to the usual service port 10 and exhaust port 11 in the main slide valve seat is also provided with a port 12 communicating with pipe 13 leading to the straight air brake valve 14, and the slide valve 22 is provided with a cavity 23 in addition to the exhaust cavity 24. A pipe 15 also connects the triple valve exhaust port 11 with the straight air brake valve.

Any suitable or preferred form of straight air brake valve may be employed, that shown in the drawing being of the rotary type having port 16 communicating with pipe 13, port 17 communicating with triple valve exhaust pipe 15, and an exhaust port 18 leading to the atmosphere, while the rotary valve 25 is provided with through ports 19 and 20 and a cavity 21. Air from the main reservoir may be admitted to the chamber above the rotary valve 25 of the straight air brake valve 14 through the reducing valve 26 in the usual manner, and if desired, the brake cylinder pipe may be extended to the brake cylinder upon the tender.

The operation of my improved apparatus is as follows: The system being charged with air under pressure and the straight air brake valve in the normal running position, Fig. 5, with the triple valve exhaust pipe 13 open to the atmosphere through ports 17 and 18 and cavity 21, the automatic brake may then be applied and released in the usual manner by the customary movements of the automatic brake valve 3, as will be readily understood. When the usual reduction is made in train pipe pressure for applying brakes in automatic service, the triple valve piston operates the graduating valve to open the service port 26 in slide valve 22 and moves said slide valve to service application position in which port 26 registers with port 10 to supply air from the auxiliary reservoir through port 10 and pipe 8 to the brake cylinders in the usual way. In this position of the slide valve 22 the cavity 23, which may also connect with port 26, establishes communication from the brake cylinder through ports 10 and 12 and pipe 13 to port 16 of the straight air brake valve, which is closed in the running position, as shown in Fig. 5. After making an automatic service application of the engine brake, if it be desired to release or grade down the brake cylinder pressure without moving the triple valve to release position it may be done by turning the straight air brake valve to release position, as shown in Fig. 8, in which the cavity 21 connects ports 16 and 18 and air from the brake cylinder is released to the atmosphere. If then it be desired to reapply the engine brakes with straight air, either with or without releasing the triple valve, the straight air brake valve may be moved to application position, Fig. 7, in which port 19 registers with port 17, and port 20 with port 16 whereby air is admitted to both pipes 13 and 15. If the triple valve is in service position air will be admitted through cavity 23 and ports 26 and 10 to the brake cylinder, but if the triple valve is in release position air will be admitted through cavity 24 and port 10 to the brake cylinder, so that in either case the engine brake will be applied with straight air. The triple valves of the automatic system may then be moved to release position and the auxiliary reservoirs recharged while the engine brakes are held applied by means of the straight air brake valve. It will now be apparent that the engine brake cylinder pressure may be released or varied up or down at will by means of the straight air brake valve at all times except when an emergency application of the brakes is made and the triple valve makes its extreme movement to emergency position in which it cuts off communication from the straight air brake valve to the engine brake cylinder. The apparatus is therefore capable of effecting an emergency application of the brakes at any time regardless of the position of the straight air brake valve.

From the foregoing description it will now be seen that I have provided a combined apparatus having an automatic valve device, or triple valve, operated by the usual variations in train pipe pressure and provided with means whereby the engine brake cylinder pressure may be controlled by a separate manually operated or straight air brake valve when the triple valve is in either release or service position, but is cut off from such control in emergency applications.

Having now described my invention, what I claim as new and desire to secure by Letters Patent, is:—

1. In an air brake apparatus, the combination with the automatic system having a brake cylinder, a train pipe and a valve device operated by variations in train pipe pressure, of a straight air brake valve for supplying air to the brake cylinder, the automatic valve device having means for establishing communication from the straight air brake valve to the brake cylinder in service application position.

2. In an air brake apparatus, the combination with an automatic brake valve, a train pipe and an automatic valve device for applying brakes, of a manually operated valve for also controlling the application of brakes dependent on the position of said automatic valve device, and means whereby the brake cylinder pressure may be controlled by the manually operated valve when the automatic valve device moves to application position.

3. In an air brake apparatus, the combination with an automatic brake valve, a train pipe, an auxiliary reservoir and brake cylinder, of a straight air brake valve and a triple valve device having means for establishing communication from the straight air brake valve to the brake cylinder in service position.

4. In an air brake apparatus, the combination with an automatic brake valve, a train pipe, auxiliary reservoir, triple valve, and brake cylinder, of a straight air brake valve connected to the triple valve exhaust port, the triple valve having means in service position for establishing communication from the straight air brake valve to the brake cylinder.

5. In an air brake apparatus, the combination with a train pipe, automatic brake valve, and brake cylinder, of a straight air brake valve, and a triple valve device having means for cutting the straight air brake valve into control of the brake cylinder pressure in service applications and out of control in emergency applications.

6. In an air brake apparatus, the combination with a train pipe, auxiliary reservoir and brake cylinder, of a straight air brake valve, and a triple valve device having means for establishing communication from the straight air brake valve to the brake cylinder in release position and also in service position.

7. In an air brake apparatus, the combination with a train pipe, auxiliary reservoir and brake cylinder, of a straight air brake valve, and a triple valve device having means for establishing communication from the straight air brake valve to the brake cylinder in service position and for closing said communication in emergency position.

8. In a fluid pressure brake, the combination with a train pipe and an automatic valve device operating upon a reduction in train pipe pressure for effecting an application of the brakes, of a manually operated valve for also supplying air to the brake cylinder through ports controlled by the automatic valve device while the brakes are applied automatically.

In testimony whereof I have hereunto set my hand.

GEORGE ALBERT BOYDEN.

Witnesses:
ROBERT McLEOD JACKSON,
WILFRED L. SNIDER.

Copies of this patent may be obtained for five cents each, by addressing the "Commissioner of Patents, Washington, D. C."